United States Patent [19]

Tenison

[11] 4,423,670
[45] Jan. 3, 1984

[54] FERMENTING AND CARBONATING APPARATUS

[76] Inventor: Earnest M. Tenison, 506 E. 11th St., Port Angeles, Wash. 98362

[21] Appl. No.: 393,249

[22] Filed: Jun. 29, 1982

[51] Int. Cl.$^3$ .............................................. A23L 2/40
[52] U.S. Cl. .................................. 99/275; 99/323.1;
  426/15; 426/16; 426/477; 435/313; 261/DIG. 7
[58] Field of Search ................. 99/323.1, 323.2, 277.1,
  99/277.2, 275, 277; 426/422, 15, 16, 11, 477;
  435/313; 261/DIG. 7

[56] References Cited

U.S. PATENT DOCUMENTS

| | | | |
|---|---|---|---|
| 2,086,073 | 7/1937 | Francescon | 99/277.1 |
| 2,108,661 | 2/1938 | Farrier | 99/277.1 |
| 2,114,009 | 4/1938 | Ramsay | 99/277.1 |
| 2,203,229 | 6/1940 | Nilsson | 99/277.1 |
| 3,492,671 | 1/1970 | Hovey | 99/323.2 |
| 4,173,656 | 11/1979 | Duggins | 426/422 |
| 4,316,409 | 2/1982 | Adams | 261/DIG. 7 |
| 4,395,940 | 8/1983 | Child | 261/DIG. 7 |

Primary Examiner—Robert W. Jenkins
Attorney, Agent, or Firm—Sughrue, Mion, Zinn, Macpeak & Seas

[57] ABSTRACT

An apparatus for fermenting and carbonating beverages comprises a container for holding a quantity of beverage to be treated. A cap for closing the container has a cup attached to the top thereof and a valve therein for permitting access between the inside of the container and the cup. A first tubular chamber is attached to the inside of the cap by means of a depending circular flange. The first chamber with a valve in one end contains a charge of carbonating material which treats the beverage as it enters the container through an aperture therein. A second tubular chamber is attached to the inside of the cap by means of an outer depending concentric circular flange. The second chamber where fermenting occurs has a plurality of apertures therein for permitting free flow of the beverage therethrough and a micro-fine filter therein for trapping sediment during the fermenting and carbonating process. A user may determine if fermentation and carbonation is occuring by placing a small quantity of water in the cup and by opening the valve whereby gas will enter the water in the cup causing bubbling therein thus indicating that the fermenting and carbonating process is progressing properly. The cap may be used without the chambers when it is desired to treat fruits and vegetables.

16 Claims, 4 Drawing Figures

U.S. Patent  Jan. 3, 1984  4,423,670
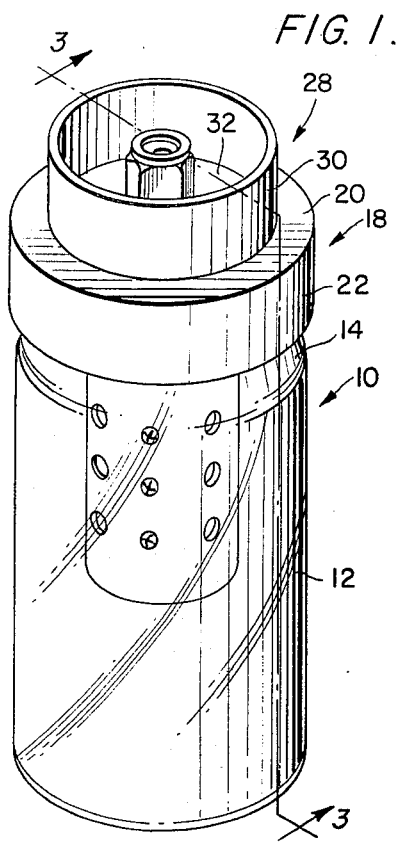
FIG. 1.
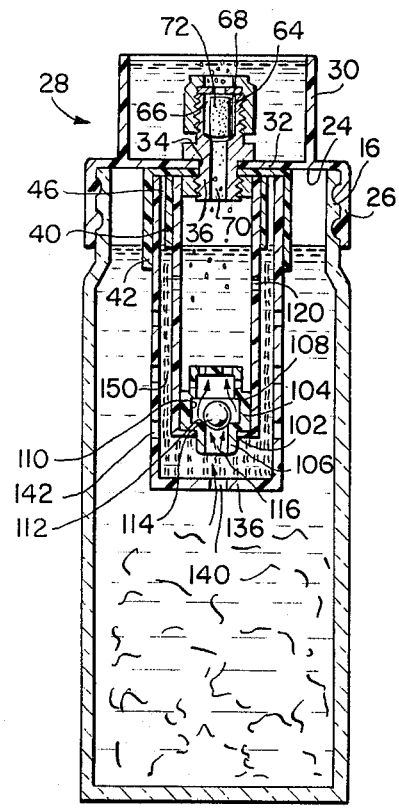
FIG. 3.
FIG. 4.
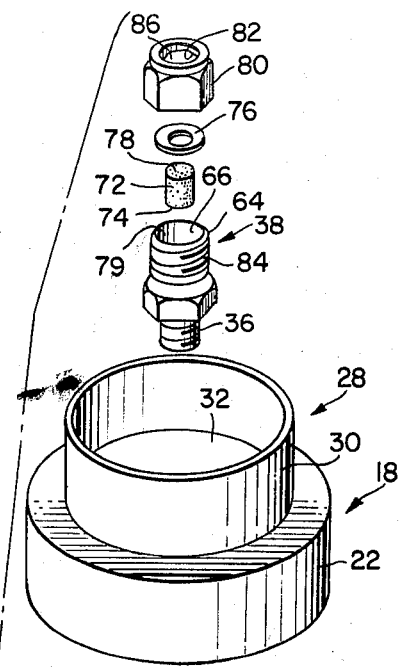
FIG. 2.

FERMENTING AND CARBONATING APPARATUS

BACKGROUND OF THE INVENTION

1. Field of the Invention

This invention pertains to a device for fermenting and carbonating beverages, fruits and vegetables.

2. Statement of the Prior Art

This prior art discloses structures for fermenting beverages including a container for holding a beverage and a second member containing a chemical or a filter is inserted into the container. These structures do not disclose a container for holding a beverage to be treated having a unique cap and cup structure having a valve therein. The cap and cup structure also support a plurality of concentric tubular chambers on the inside thereof for holding carbonating and filtering material. A ball valve is employed in the inner most tubular chamber for permitting water to enter and mix with the carbonating materials whereby a gas is produced which moves throughout the container and beverage. A user may determine if the fermenting and carbonating process is progressing by placing a small quantity of water in the cup and by opening the valve whereby pressurized gas within the container will escape into the water causing bubbling therein thus indicating proper fermenting and carbonating. Patents relating to this field of invention include the following U.S. patents:

| Patentee | U.S. Pat. No. | Issue Date |
| --- | --- | --- |
| L. H. Farrier et al | 2,108,661 | Feb. 15, 1938 |
| O. F. Nilsson et al | 2,203,229 | June 4, 1940 |
| D. I. Hovey | 3,492,671 | Jan. 27, 1970 |
| Sellers | 3,946,780 | Mar. 30, 1976 |
| Duggins | 4,173,656 | Nov. 6, 1979 |

SUMMARY OF THE INVENTION

This invention provides a fermenting and carbonating apparatus which comprises a container for holding a beverage or other material to be treated. A cap for the container has a cup on the top thereof and a valve therein for permitting access between the container and the cup. The cap has circular depending concentric flanges which will have pressed fitted therein the open ends of tubular chambers. One chamber contain a carbonating charge and the other a filter for treating the beverage as the beverage circulates within the chambers and the container.

It is one object of this invention to provide a fermenting and carbonating device for consumer use which will be inexpensive to manufacture and easy for the oridinary consumer to use.

It is another object of this invention to provide a fermenting and carbonating device having a container for holding a beverage or other material to be treated. A cap is provided for closing the container and has a cup thereon and a manually adjustable valve therein for permitting escape of undesired gas pressure which may build up during the fermenting and carbonating process.

It is yet another object of this invention to provide a fermenting and carbonating device whereby the user may determine whether or not proper fermentation and carbonation is occuring by placing a small quantity of water in the cup and by opening the valve allowing pressurized gas to escape therethrough thus causing bubbling in the water which indicates that fermentation and carbonation is progressing properly.

Yet another object of this invention is to provide a fermenting and carbonating device having a container and a cap therefor, the cap having concentric circular flanges centrally positioned with respect to the circular flange of the cap. The innermost of the circular flanges receives an open end of a first tubular container. The first tubular chamber has a plurality of openings near the open end thereof and a valve in the closed end. A portion of the beverage to be treated passes into the first chamber through the valve and the resulting carbonating gas charge permeates the beverage in the beverage container. The valve in the closed end of the chamber will close under the weight of the liquid so that the liquid may be disposed after carbonation has completed.

A further object of this invention is to provide a fermenting and carbonating device having a container and a cap therefor, the cap having concentric circular flanges centrally positioned with respect to the circular flange of the cap. The outermost circular flange receives an open end of a second tubular chamber which telescopes over the first chamber. The second chamber has a plurality of apertures about the circumference thereof whereby the beverage in the container may pass freely into the second chamber and then into the first chamber. Fermenting occurs in the second chamber which has micro-fine filter for trapping sediment which may occur during the fermentation and carbonation process.

These and other objects of this invention will become apparent from a reading of the specification taken into conjunction with the annexed drawing.

BRIEF DESCRIPTION OF THE DRAWINGS

FIG. 1 is a perspective view of the device showing the container, the cap having the cup attached thereo, a valve in the cup which extends through the cap and the outermost or the second of the tubular chambers.

FIG. 2 is an exploded view of the device showing the valve, flanged cap with cup attached thereto, concentric circular flanges, an innermost or first tubular chamber and an outer or second chamber.

FIG. 3 is a view in section showing the components of FIG. 2 in assembled condition.

FIG. 4 is a modification of the device showing the container and cap without the chambers.

DESCRIPTION OF THE PREFERRED EMBODIMENT

Referring in more detail to the drawings, in FIG. 1 there is shown a fermenting and carbonating device 10 comprising a container 12 which may be transparent and having a neck 14 with a number of threads 16 thereabout. A beverage to be treated is placed in the container and the container is closed by a cap 18.

The cap has a flat top surface 20, a circular depending flange 22 and an inner flat surface 24. The circular flange 22 has a number of threads 26 whereby the cap may be fastened to the threaded neck 14. A cup 28 has a vertical circular wall 30 and a bottom 32. The cup may be a single unit which will be secured centrally of the top surface 20 of the cap or it may be molded integrally with the cap as in FIG. 3. An aperture 34 is drilled through the center of the bottom 32 of the cup and through the cap. The shank 36 of a valve 38 extends through the apertures.

Depending from the inner flat surface 24 of the cap there is a circular depending flange 40 and an outer circular depending flange 42. The bottom edge of the latter extends below the bottom edge of the former. There is a space 46 between the flanges 40 and 42. The flanges 40 and 42 may come as a unit 43 having a top surface 50 and an inner surface 52. An aperture 54 is drilled through the surfaces 50 and 52 as shown. Unit 43 is secured to the inner flat surface 24 of the cap such that the aperture 54 will coincide with the aperture 34 of the cap and cup. The shank 36 of the valve assembly 38 extends through aperture 54 and a threaded nut 60 is used to secure the valve assembly 38, cap 18 and the flange unit 43 together.

The valve unit 38 will now be described and consists of a valve housing 64 having an inside wall 66 which terminates at the bottom in a valve seat 68, FIG. 3, and at the top in a seat 79. A central passageway 70 extends through the shank 36 and connects the inside of the valve housing and the space within the flange 40. A cylindrical rod 72 has an end 74 which seats against valve seat 68. A washer 76 seats within the seat 79 and rests on the top end 78 of the rod 72. The rod 72 is slightly longer than the depth of the valve housing but is compressible when the nut 80 having an insight flange 82 smaller in diameter than the diameter of the washer is threaded onto the threaded neck 84 whereby the washer 76 is forced into the seat 79 thus closing the passage or aperture 86 in the nut 80 and the passage 70 in the shank 36. It will be apparent that the valve 38 may be selectively adjusted to either completely close the valve passageway or to permit selective incremental openings therethrough, the purpose of which will be apparent hereafter.

A first tubular chamber 90 has an inside wall 92, an outside wall 94, an open end 96 having a top flat surface 98, and a closed bottom 100 having an aperture 102 therein. A valve housing 104 has a stem 106 which extends through the aperture 102 in a tight fitting manner. It may even be threaded. The valve housing 104 has a circular wall 106 extending in the opposite direction from the nipple 102 and is larger in diameter than the nipple. The inside wall 110 of the housing 104 terminates at the bottom in a valve seat 112 which receives a ball valve 114 therein whereby the passage 116 through the nipple 102 will be closed. It will be understood that the diameter of the ball 114 is smaller than the diameter of the housing 104. It will also be understood that the only access into the chamber 90 from the bottom will be through the passage 116 when the ball valve 114 is unseated. A perforated hollow cap 118 is pressed fitted into the valve housing 104 whereby the ball valve 114 will be kept captive therein. The upper end 120 of the chamber 90 has a plurality of apertures 122 about the circumference thereof. As can be seen in FIG. 3, the chamber 90 is pressed fitted into the flange 40 whereby the chamber will be held firmly therein and the ball valve 114 will seat against the valve seat 112. The chamber 90 will contain a charge of carbonating material which will be either in powder packaged form or cartridge form of known types. A second outermost tubular chamber 130 has an inside wall 122, an outside wall 134, an open end 136 and a closed bottom end 138 having an aperture 140 therein. There are a plurality of apertures 142 in the chamber walls and they extend about the circumference and longitudinally of the chamber. The open end of the chamber is pressed fitted into the flange 42 whereby it is held firmly therein. The chamber 130 will contain a micro-fine filter material 150 for trapping sediment which may occur during the fermentation which occurs in the second chamber. The chamber per se can be the filter.

In operation, a quantity of beverage to be treated is placed in the container 12. A charge of carbonating material such as $H_2O$ in either solid or cartridge form is placed in chamber 90 and the chamber 90 is inserted in to the circular flange 40. The outer or second chamber 130 will contain a micro-fine filter and it is telescoped over the inner or first chamber and secured by the flange 42. There will be a space between the walls of the chambers. The cap is secured to the neck of the container and the valve 38 closed. The liquid will enter the second chamber through the apertures and into the first chamber through the valve and mix with the $H_2O$. Gas will develop and permeate the liquid causing carbonation. The fermenting process will occur in the second chamber as the liquid or beverage circulates within the chamber and the container. When the cap and chambers are removed from the container the valve in the valve housing will close thus trapping the carbonated liquid which will then be disposed. The micro-fine filter in the outer chamber will function to trap sediment which may occur during the fermentation process. In order to determine whether the beverage is being properly treated, a small quantity of water is placed in the cup 30 and the valve 38 slightly opened to allow pressurized gas to escape whereby bubbles will occur in the water. The bubbling in the water will be an indication that the fermentation and carbonation process is continuing properly. If no bubbles occur, this will indicate that the fermentation and carbonation process is not occurring properly.

FIG. 4 shows a modification of the device wherein the chambers 90 and 130 are eliminated when it is desired to treat fruits and vegetables.

While the invention has been shown and described in detail with reference to a preferred embodiment thereof, it will be understood to those skilled in the art to which this invention pertains that various changes in form and detail may be made therein without departing from the spirit and scope of the invention.

What I claim is:

1. A fermenting and carbonating apparatus comprising:
    a container and a cap therefor;
    a valve in the cap;
    a first chamber within the container attached to the cap;
    a second chamber within the container attached to the cap; and
    material within the first and second chambers for treating material within the container.

2. A fermenting and carbonating apparatus as defined in claim 1, wherein:
    said cap having a cup attached thereto, said valve permitting access between the container and the cup.

3. A fermenting and carbonating apparatus as defined in claim 1, wherein:
    said valve being selectively operated to close the access between the container and the cup.

4. A fermenting and carbonating apparatus as defined in claim 1, wherein:
    said valve being selectively operated to permit incremental openings of the valve permitting gas to enter the cup from the container.

5. A fermenting and carbonating apparatus as defined in claim 4, and:
said cup containing a quantity of liquid which is caused to bubble by said gas whereby a user may determine that the material within the container is fermenting and carbonating.

6. A fermenting and carbonating apparatus as defined in claim 1, wherein
said cap having depending flanges, said first chamber pressed fitted into one of said flanges and said second chamber pressed fitted into the outer of said flanges.

7. A fermenting and carbonating apparatus as defined in claim 1, wherein:
said first and said second chambers being concentric of each other.

8. A fermenting and carbonating apparatus as defined in claim 1, wherein:
said first chamber having apertures therein near one end thereof and a valve in the opposite end to close an aperture therein.

9. A fermenting and carbonating apparatus as defined in claim 1, wherein:
said second chamber having a plurality of apertures therein for permitting material within the container to circulate therethrough and into the first chamber through the valve therein.

10. A fermenting and carbonating apparatus as defined in claim 1, and:
said material in said first chamber comprising a charge of carbonating material.

11. A fermenting and carbonating apparatus as defined in claim 1, and:
said material in said second chamber comprising a filter for separating and collecting sediment in the material being fermented and carbonated.

12. A fermenting and carbonating apparatus as defined in claim 11, and:
said filter being a micro-fine filter.

13. A fermenting and carbonating apparatus as defined in claim 1, wherein:
said material being a beverage.

14. A fermenting and carbonating apparatus as defined in claim 1, wherein:
said material being fruits or vegetables.

15. A fermenting and carbonating apparatus comprising:
a container and a cap therefor;
a cup on the cap;
a valve in the cap and cup permitting access between the container and the cup;
a first chamber within the container attached to the cap;
a second chamber within the container attached to the cap; and
material within the first and second chambers for treating material within the container.

16. A fermenting and carbonating apparatus comprising:
a container and a cap therefor;
a cup on the cap;
a valve in the cap and cup permitting access between the container and cup, said valve selectively manually operated;
a first chamber within the container attached to the cap;
a second chamber within the container attached to the cap;
said first and second chambers being concentric of each other; and
material within said first and second chambers for treating material within the container.

* * * * *